Feb. 23, 1971      B. J. M. G. BRUGMAN      3,564,646
DEVICE FOR CUTTING THE ARTERY IN THE NECK OF POULTRY
Filed Nov. 27, 1968      2 Sheets-Sheet 1
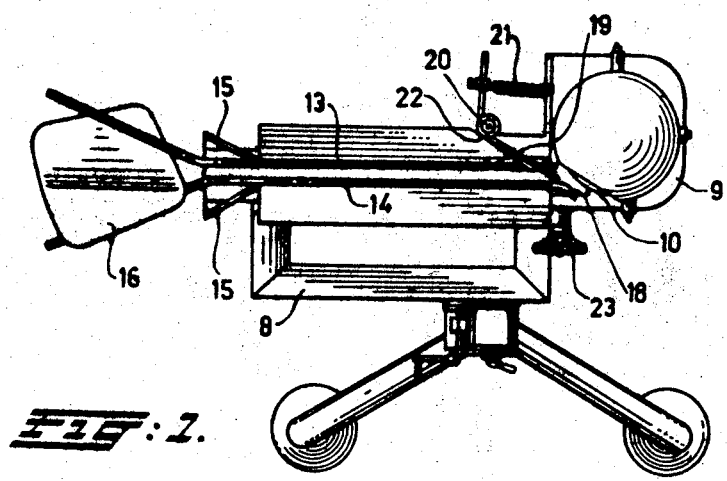
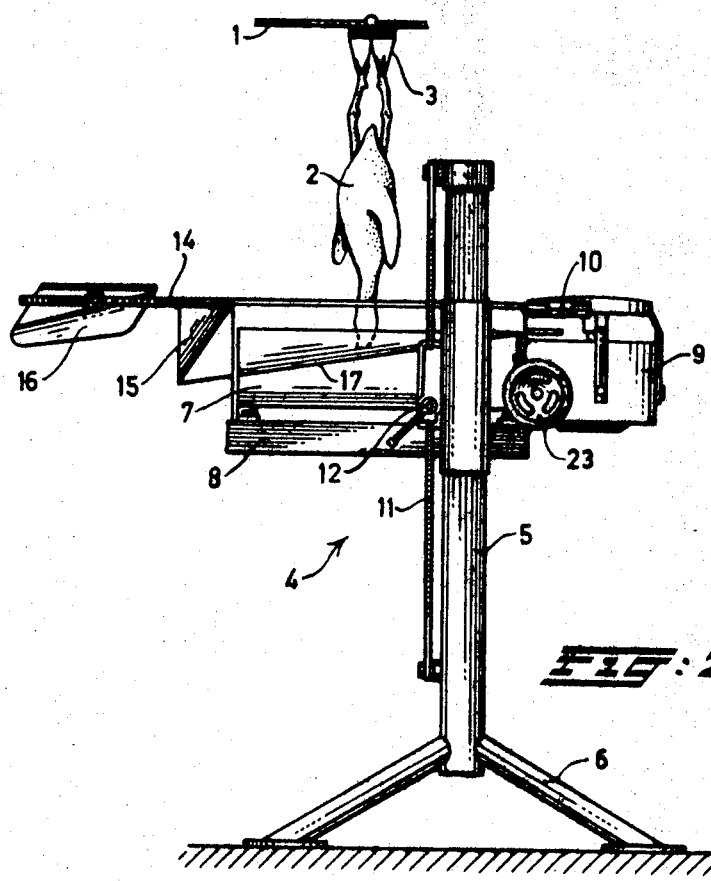
BRAM JAN MARTHA GERRIT BRUGMAN
INVENTOR
Edmund M. Jaskiewicz
ATTORNEY

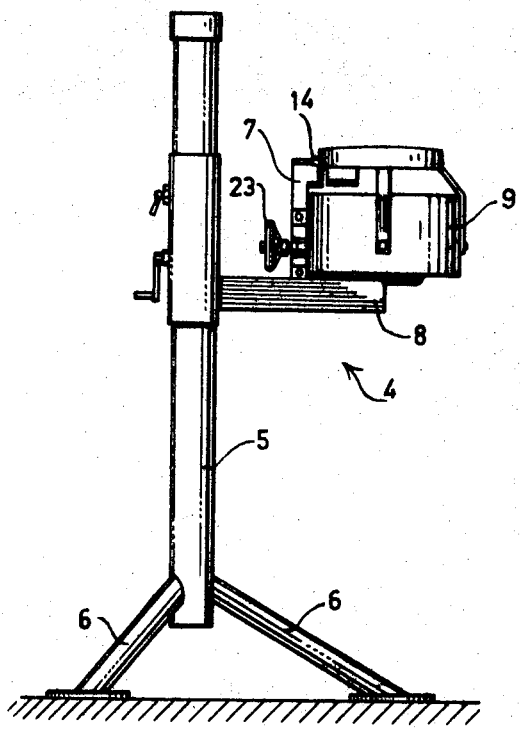

United States Patent Office 3,564,646
Patented Feb. 23, 1971

3,564,646
DEVICE FOR CUTTING THE ARTERY
IN THE NECK OF POULTRY
Bram J. M. G. Brugman, Boxmeer, Netherlands, assignor to Stork Amsterdam N.V., Amsterdam, Netherlands
Filed Nov. 27, 1968, Ser. No. 779,485
Claims priority, application Great Britain, Oct. 11, 1968, 48,334/68
Int. Cl. A22b 3/08
U.S. Cl. 17—11                      5 Claims

ABSTRACT OF THE DISCLOSURE

A device for cutting the artery in the neck of poultry with a guide channel for the necks thereof and an upper edge which diverges to a gradually narrowing inlet, the bottom of the channel being inclined upwardly from the inlet to the outlet end of the channel and a rotating disc being placed at the end of the guide channel, protruding into the channel while a horizontal pivotal lever is placed across the upper side of the channel before the cutting disk.

---

My invention relates to a device for cutting the artery in the neck of poultry which is moved hanging by their legs on hooks of a conveyor track.

For the slaughtering and subsequent handling of poultry, e.g. chickens, in great quantities and in a continuous process, the birds are hanged by means of hooks on a conveyor track which moves along the different handling stations. One method for killing the birds consists therein that firstly the birds are anaesthetized, e.g. by electrocution, whereafter the main artery in the neck is severed so that the bird quickly bleeds to death. Up till now this severing of the main artery is effected by an attendant who cuts this artery by hand.

My invention also aims to provide a device for cutting the artery of the poultry without any further attention of an attendant being necessary, which device always effects the cut in the right place, irrespective of variations in size of the birds.

Accordingly my invention provides a guide channel for the necks of the poultry, placed beneath the conveyor track, the upper edge of which is defined by two substantial parallel guide rails which at one end diverge to define a gradually narrowing inlet, while the bottom of the channel is inclined upwardly from the inlet to the outlet end of the channel where a rotating cutting device is positioned with its axis substantially perpendicular to the longitudinal axis of the guide channel in such a way that the cutting edge is substantially at a level with the upper end of the channel and extending beyond the longitudinal axis of the channel, one guide rail ending a short distance from the disc and the other extending further and being curved outwardly and around the disc, a horizontal pivot lever being provided across the upper side of the channel, of which the pivot point lies outside the short guide rail and a greater distance from the cutting disc than the end of the lever which reaches the longer guide rails, said lever being spring-loaded in the direction of the larger guide rail.

The device according to my invention can handle birds of different sizes and with different necklengths and assures that the cut in the neck is always effected at the right place.

Preferably the inlet end of one of the guide rails is provided with an inclined guide plate for guiding the wings of the poultry. This makes it impossible that any of the wings get between the guide rails.

The distance of the outlet end of the guide channel to the edge of the cutting disc can be adjustable. Preferably also the angle of inclination of the bottom of the channel is also adjustable. This makes it possible to adjust the device to certain kinds of poultry which are to be handled. In this connection it is also advantageous when the device is carried by a support resting on the floor in such a way that the distance to the floor, and thereby to the conveyor track is adjustable.

The foregoing and other objects and advantages of the invention will appear in the description to follow. In the description reference is made to the accompanying drawings, which form a part hereof, and in which there is shown by way of illustration and not of limitation specific forms in which the invention may be embodied.

In the drawings:

FIG. 1 a plan view of the device according to the invention;

FIG. 2 a side view of this device;

FIG. 3 an end view of the device.

The device as shown in the figures, is placed beneath a conveyor track 1 on which the poultry 2, hanging by their legs on the hooks 3, are moved along to the device according to the invention denoted generally by the numeral 4. This device comprises a stand 5, resting on the ground by means of legs 6, and carrying the guide channel 7 by means of the supporting frame 8. The guide channel 7 carries at one end a housing 9 in which is placed a motor (not shown) which drives the circular cutting disc 10. By means of the rack- and pinion-drive 11, 12 the frame 8, and thereby the channel 7 and the housing 9 can be moved in a vertical direction along the stand 5; in this way it is possible to adjust the device to the length of a certain kind of poultry which is to be treated.

The guide channel 7 is at its open end bounded by two guide rails 13, 14, while its open inlet end is provided with two deflecting plates 15. The guide rail 14 carries the deflecting plate 16 which is positioned in such a way that long wings are deflected to outside the guide channel. At the inlet end the guide rails 13, 14 diverge to form a gradually narrowing inlet.

The guide way 13 is shorter than the guide rail 14 and ends, as FIG. 1 shows, some distance from the cutting disc 10. The guide rail 14 is, as said, somewhat longer and its curved end 18 extends for some distance along the cutting disc 10. A lever 19, pivoting around the axis 20 is positioned just before the outlet end of the guide channel and its free end is urged towards the guide rail 14 by means of the weak spring 21. Its displacement is limited by the abutment plane 22.

The figures show how the bottom 17 of the guide channel inclined upwardly from the inlet to the outlet of the channel, where the cutting disc is positioned.

The device acts as follows:

The poultry 2, hanging by their legs on the conveyor track 1, is moved to the device and the head of the animal is caught between the guide rails 13 and 14. To compensate for differences in length of the animals within a given range (great differences must be compensated for by adjusting the height of the device on the column 5) the bottom 17 of the guide channel 7 is inclined; the head of the animal strikes the bottom 17 and, when the animal 2 is moved along, is forced upwardly so that the end of its travel along the guide channel the head is always at the exact position with regard to the cutting disc 10. Just before the head of the animal reaches the end of the channel it strikes the lever 19. It takes a short time to overcome the tension of the spring 21; during this time the head of the animal is held back with regard to the rest of the body and then the tension of the spring 21 is overcome and the neck of the animal pushes away the lever 19 and moves quickly along the curved part 18 of the guide rail 14 and the cutting disc 10 which cuts through the neck into the main artery. The depth of this cut is determined by the distance between the cutting disc 10 and the curved end 18, said distance being adjustable by means which are not shown in the figures, but which are actuated by the handwheel 23.

It is clear that the neck is always cut in the right place by a combined action of the inclined bottom 17 of the guide channel 7 and the retaining of the lever 19 which has as a result that firstly the head of the animal is brought on the exact position with respect to the cutting disc 10 while furthermore the body of the animal is stretched and then suddenly released through the action of the lever 19 and the spring 21.

While preferred embodiments of the invention have been shown and described, it is to be understood that changes and variations may be made without departing from the spirit and scope of the invention as defined in the appended claims.

What I claim is:

1. A device for cutting the artery in the necks of poultry suspended by their legs from hooks on a conveyor track and moving along a predetermined path, and comprising a guide channel having an inclined closed bottom positioned below a conveyor track, a pair of fixed and substantially horizontal parallel guide rails on the upper edges of said guide channel and diverging at one end thereof to define a gradually narrowing inlet end, said guide channel bottom being inclined upwardly from said inlet end to an opposite end of the guide rails, a rotatable cutting disc at said opposite end of the guide rails and having its rotary axis substantially perpendicular to the longitudinal axis of said guide channel, the cutting edge of said disc being at substantally the same level as said guide rails and protruding into the guide channel beyond the longitudinal axis thereof, one of said guide rails terminating a short distance before said cutting disc and the other guide rails extending past the disc and curving outwardly and around the disc, a horizontal lever extending across the upper edges of said guide channel and pivotally mounted outwardly of the shorter guide rail, the end of said lever extending in the direction of the longer guide rail and located between the cutting edge of the disc and the pivot point of the lever, and spring means for urging said lever toward said longer guide rail.

2. A device according to claim 1 and comprising an inclined guide plate on the inlet end of one of the guide rails for guiding the wings of the poultry.

3. A device according to claim 1 wherein the distance of the outlet end of the guide channel to the edge of the cutting disc is adjustable.

4. A device according to claim 1 wherein the angle of inclination of the bottom of the channel is adjustable.

5. A device as claimed in claim 1 wherein the device is carried by a support resting on the floor in such a way that the distance to the floor is adjustable.

References Cited

UNITED STATES PATENTS

| 2,129,968 | 9/1938 | Sargent et al. | 17—11 |
| 2,210,377 | 8/1940 | Onorato et al. | 17—11 |
| 3,477,092 | 11/1969 | Simmons | 17—11 |

FOREIGN PATENTS

| 298,269 | 11/1965 | Netherlands. | |

HUGH R. CHAMBLEE, Primary Examiner